United States Patent
Ogata et al.

(10) Patent No.: US 10,862,614 B2
(45) Date of Patent: Dec. 8, 2020

(54) BASE STATION APPARATUS

(71) Applicant: SoftBank Corp., Tokyo (JP)

(72) Inventors: Daigo Ogata, Tokyo (JP); Atsushi Nagate, Tokyo (JP); Teruya Fujii, Tokyo (JP)

(73) Assignee: SoftBank Corp., Tokyo (JP)

(*) Notice: Subject to any disclaimer, the term of this patent is extended or adjusted under 35 U.S.C. 154(b) by 172 days.

(21) Appl. No.: 16/072,249

(22) PCT Filed: Jan. 25, 2017

(86) PCT No.: PCT/JP2017/002546
§ 371 (c)(1),
(2) Date: Jul. 24, 2018

(87) PCT Pub. No.: WO2017/131032
PCT Pub. Date: Aug. 3, 2017

(65) Prior Publication Data
US 2019/0036641 A1  Jan. 31, 2019

(30) Foreign Application Priority Data
Jan. 29, 2016 (JP) .................................. 2016-015876

(51) Int. Cl.
*H04L 1/00* (2006.01)
*H04W 16/32* (2009.01)
(Continued)

(52) U.S. Cl.
CPC ........ *H04L 1/0003* (2013.01); *H04J 11/0053* (2013.01); *H04L 1/00* (2013.01);
(Continued)

(58) Field of Classification Search
CPC ....... H04L 1/0003; H04L 1/0053; H04L 1/00; H04L 1/0009; H04L 1/0015; H04L 1/16;
(Continued)

(56) References Cited

U.S. PATENT DOCUMENTS

2011/0310830 A1* 12/2011 Wu ..................... H04L 27/2601
370/329
2014/0269457 A1* 9/2014 Folke ................ H04W 72/1226
370/280

(Continued)

FOREIGN PATENT DOCUMENTS

JP         2012-129793 A    7/2012
WO     WO 2015/099173 A1    7/2015

*Primary Examiner* — Christopher R Crompton
(74) *Attorney, Agent, or Firm* — Muirhead and Saturnelli, LLC

(57) ABSTRACT

A base station apparatus capable of preventing occurrence of a communication delay when performing an inter-cell interference control using an ABS is provided. The base station apparatus is capable of performing an inter-cell interference control by setting an ABS pattern with one cycle of a predetermined number of subframes, and when the ABS pattern is to be switched, changes an MCS (Modulation and Coding Scheme) index value to be determined by an adaptive modulation control, for a communication within a predetermined period of time on or before a switching time of the switching, with respect to a subframe in which a communication with a mobile station apparatus is allowed before switching the ABS pattern.

14 Claims, 13 Drawing Sheets

(51) Int. Cl.
*H04L 1/16* (2006.01)
*H04L 5/00* (2006.01)
*H04L 1/18* (2006.01)
*H04W 28/04* (2009.01)
*H04J 11/00* (2006.01)
*H04L 27/26* (2006.01)
*H04W 72/04* (2009.01)
*H04W 72/08* (2009.01)
*H04B 7/0413* (2017.01)

(52) U.S. Cl.
CPC .......... *H04L 1/0009* (2013.01); *H04L 1/0015* (2013.01); *H04L 1/16* (2013.01); *H04L 1/1812* (2013.01); *H04L 1/1822* (2013.01); *H04L 1/1887* (2013.01); *H04L 5/0023* (2013.01); *H04L 5/0032* (2013.01); *H04L 5/0053* (2013.01); *H04L 5/0073* (2013.01); *H04L 5/0082* (2013.01); *H04L 27/2691* (2013.01); *H04W 16/32* (2013.01); *H04W 28/04* (2013.01); *H04W 72/0446* (2013.01); *H04W 72/082* (2013.01); *H04B 7/0413* (2013.01); *H04L 5/0091* (2013.01)

(58) Field of Classification Search
CPC ... H04L 1/1812; H04L 1/1822; H04L 1/1887; H04L 5/0023; H04L 5/0032; H04L 5/0073; H04L 5/0082; H04L 27/2691; H04L 5/0091; H04J 11/0053; H04W 16/32; H04W 28/04; H04W 72/0446; H04W 72/082; H04B 7/0413
USPC ........................................................ 370/329
See application file for complete search history.

(56) References Cited

U.S. PATENT DOCUMENTS

| | | | |
|---|---|---|---|
| 2015/0085767 A1* | 3/2015 | Einhaus | H04L 1/0001 370/329 |
| 2015/0305004 A1* | 10/2015 | Ohta | H04W 16/04 370/330 |
| 2016/0006659 A1* | 1/2016 | Kim | H04W 36/16 370/235 |
| 2016/0345338 A1* | 11/2016 | Kim | H04W 24/02 |
| 2017/0111919 A1* | 4/2017 | Madan | H04W 72/1273 |
| 2017/0180100 A1* | 6/2017 | Lee | H04L 5/0032 |
| 2017/0222773 A1* | 8/2017 | Sen | H04L 1/20 |
| 2018/0324693 A1* | 11/2018 | Yu | H04W 72/1205 |

* cited by examiner

BASE STATION APPARATUS

TECHNICAL FIELD

The present invention relates to a base station apparatus of a mobile communication system.

BACKGROUND ART

In order to cope with a rapid increase in traffic in a recent mobile communication system, a demand for a small-cell base station (called such as "small-cell base station", "micro-cell base station", etc.), which forms a cell (radio communication area) smaller than a conventional macro-cell base station, is growing. Since the small-cell base stations are widely disposed in multiple stations for a countermeasure of traffic, it is expected that the small-cell base station is disposed in a cell of the conventional macro-cell base station. Therefore, there is a problem that an inter-cell interference occurs between the macro-cell base station and the small-cell base station. As a technique for reducing the inter-cell interference, an inter-cell interference control technique in time domain (subframe unit) is known (for example, refer to Patent Literature 1), which is on the premise that the macro-cell base station and the small-cell base station are time synchronized in time with each other. This inter-cell interference control technique is a technique conforming to the LTE (Long Term Evolution)-Advanced standards, and also called as "eICIC (enhanced Inter-Cell Interference Coordination)". In this inter-cell interference control technique, for example, the macro-cell base station sets a subframe group called an ABS (Almost Blank Subframe) in which a macro-cell base station does not perform a downlink transmission of a signal (data signal, upper layer control signal) in a data region to a mobile station apparatus, and the macro-cell base station notifies an ABS pattern table indicating the subframe group to a subordinate small-cell base station. The small-cell base station performs a scheduling to determine a resource allocation for a subordinate mobile station apparatus (user terminal equipment) based on the ABS pattern, and the small-cell base station stops a downlink transmission of the data signal and the upper-layer control signal to the mobile station apparatus based on the scheduling. The inter-cell interference between the macro-cell base station and the small-cell base station can thus be mutually reduced.

CITATION LIST

Patent Literature

Patent Literature 1: Japanese Unexamined Patent Application Publication No. 2012-129793.

SUMMARY OF INVENTION

Technical Problem

However, when performing an HARQ (Hybrid Automatic Repeat reQuest) retransmission control when a block error occurs in the subframe in the mobile communication system to which the conventional inter-cell interference control technique using ABS is applied, it was found that there is a following problem.

FIG. 13A and FIG. 13B are respectively an explanatory diagram of the conventional HARQ retransmission control and an explanatory diagram of a problem in the case of combining the conventional HARQ retransmission control and the inter-cell interference control technique using ABS. In the HARQ retransmission control, an HARQ retransmission control is performed with a predetermined number of subframes (HARQ ID=0 to 7) as one cycle (hereinafter called as "HARQ cycle") T. For example, as shown in FIG. 13A, when a block error occurs in the fourth subframe (HARQ ID=3) of the HARQ cycle, an HARQ retransmission of the data signal in which the block error occurred is performed by the same fourth subframe (HARQ ID=3) in the next HARQ cycle. However, as shown in FIG. 13B, the aforementioned switching of the ABS pattern (changing of the ABS) may be performed in a period between the occurrence of the block error and the HARQ retransmission, and the fourth subframe (HARQ ID=3) in which the HARQ retransmission is scheduled may switch to a subframe in which a signal transmission is not performed. It is found that, in this case, the HARQ retransmission in the fourth subframe (HARQ ID=3) cannot be performed due to the application of the aforementioned inter-cell interference control technique using ABS, the HARQ retransmission is changed to an ARQ (Automatic Repeat reQuest) retransmission in a radio link control (RLC), and a communication delay occurs.

The present invention has been made in view of the above-described problem and an objective is to provide a base station apparatus capable of preventing occurrence of a communication delay when performing an inter-cell interference control technique using ABS.

Solution to Problem

A base station apparatus according to the present invention, which is a base station apparatus capable of performing an inter-cell interference control by setting an ABS (Almost Blank Subframe) pattern with one cycle of a predetermined number of subframes, comprises means of changing an MCS (Modulation and Coding Scheme) index value to be determined by an adaptive modulation control, when the ABS pattern is to be switched, for a communication within a predetermined period of time on or before a switching time of the switching, with respect to a subframe in which a communication with a mobile station apparatus is allowed before switching the ABS pattern.

In the foregoing base station apparatus, the MCS index value determined by the adaptive modulation control may be changed based on the number of remaining transmittable times before switching the ABS pattern.

Furthermore, in the foregoing base station apparatus, a retransmission control by an HARQ (Hybrid Automatic Repeat reQuest) may be applied, and when the ABS pattern is to be switched, the MCS index value to be determined by the adaptive modulation control may be changed when performing an HARQ retransmission, with respect to a subframe in which the communication with the mobile station apparatus is allowed before switching the ABS pattern Moreover, in the foregoing base station apparatus, the MCS index value determined by the adaptive modulation control may be changed based on the number of remaining retransmittable times before switching the ABS pattern.

Further, in the foregoing base station apparatus, when a MIMO (Multiple Input Multiple Output) for transmitting two or more streams is applied, an MCS index value to be determined by a rank that is the number of transmission streams and the adaptive modulation control may be changed based on the rank and the MCS index value determined by the adaptive modulation control.

Furthermore, in the foregoing base station apparatus, the MCS index value to be determined by the adaptive modulation control may be changed to an MCS index value by which the least error occurs.

Moreover, in the foregoing base station apparatus, when the MCS index value before switching the ABS pattern cannot be changed to a value by which a data transmission with a mobile station apparatus or an HARQ retransmission of the data transmission is completed before switching the ABS pattern, an allocation of radio communication resource to the mobile station apparatus may be not performed.

Further, in the foregoing base station apparatus, the MCS index value determined by the adaptive modulation control may be changed only for a subframe to which a resource allocation in a retransmission control by the HARQ is not performed after switching the ABS pattern.

Furthermore, in the foregoing base station apparatus, after switching the ABS pattern, the changed MCS index value may be restored the value before changing.

Moreover, in the foregoing base station apparatus, the communication in which the MCS index value is changed may be a downlink communication from the base station apparatus to the mobile station apparatus or an uplink communication from the mobile station apparatus to the base station apparatus.

Further, the foregoing base station apparatus may be a base station apparatus of a small-cell base station or a base station apparatus of a macro-cell base station.

Advantageous Effects of Invention

According to the present invention, it is capable of preventing occurrence of a communication delay when performing a transmission control using an ABS.

DESCRIPTION OF EMBODIMENTS

Hereinafter, various embodiments of the present invention will be described with reference to the drawings.

Figure 1:
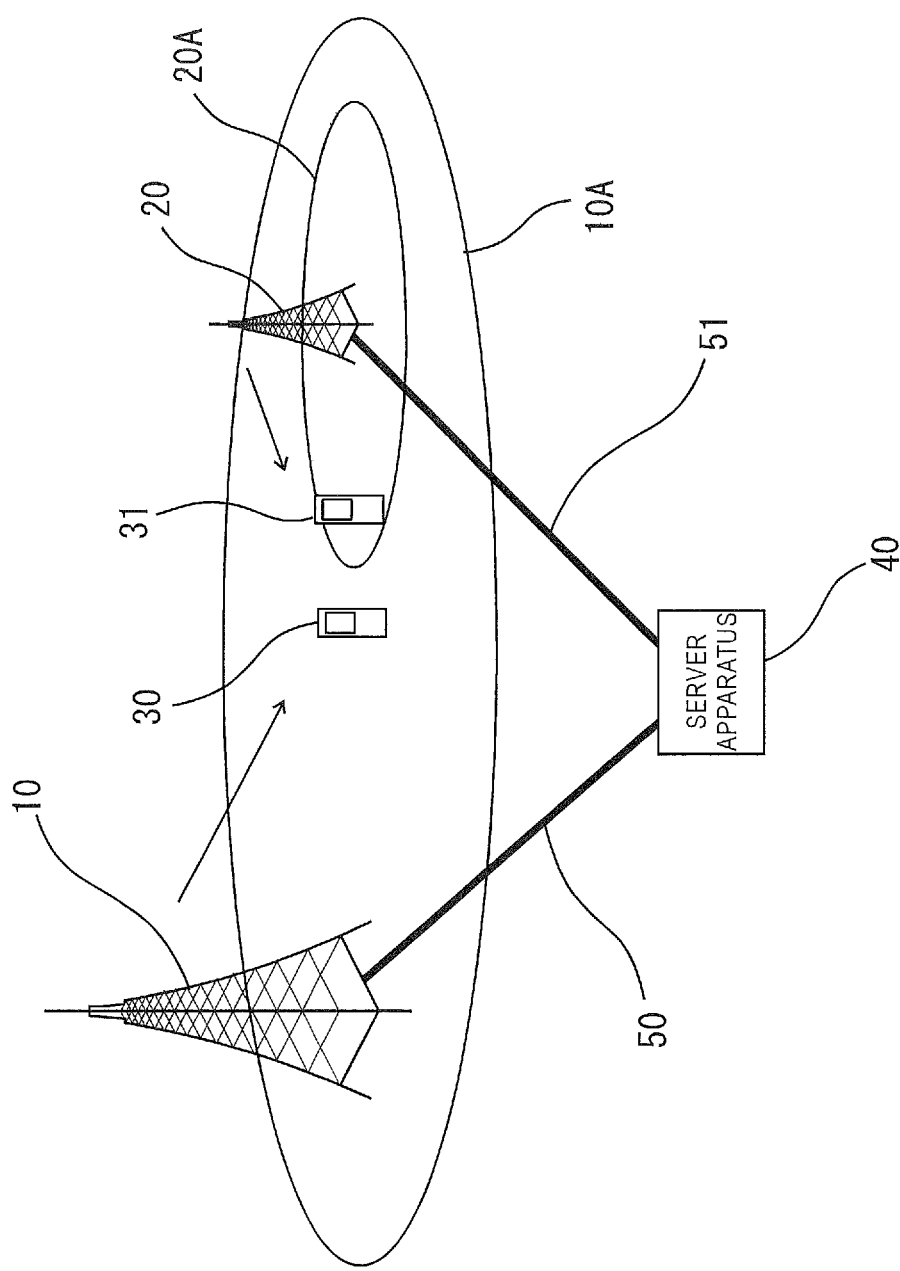
FIG. 1 is an illustration showing one example of an overall configuration of a mobile communication system with a macro-cell base station and a small-cell base station according to an embodiment of the present invention.
Figure 2:
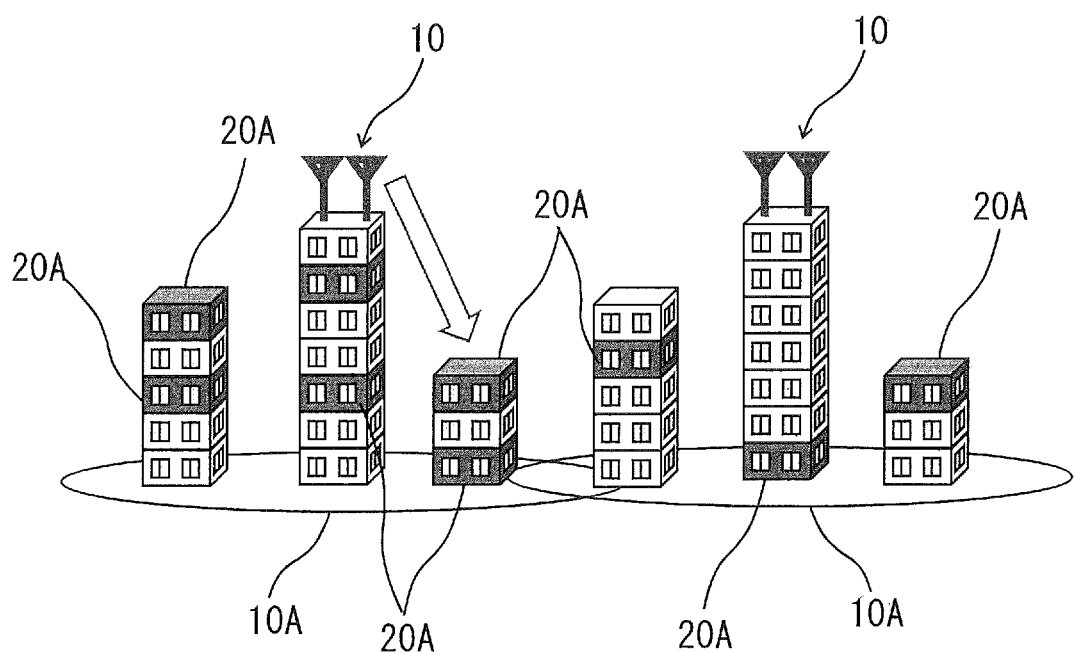
FIG. 2 is an illustration showing a situation of three-dimensional arrangement of macro-cell base stations and small-cell base stations.

FIG. 1 is an illustration showing one example of an overall configuration of a mobile communication system with a macro-cell base station and a small-cell base station according to an embodiment of the present invention. FIG. 2 is an illustration showing a situation of three-dimensional arrangement of macro-cell base stations and small-cell base stations.

In FIG. 1, the mobile communication system of this embodiment is a communication system conforming to the standard specification of LTE (Long Term Evolution)/LTE-Advanced, and includes a macro-cell base station 10 being as a first base station, a small-cell base station 20 being as a second base station located in a cell (hereinafter called appropriately as "macro cell") 10A that is a radio communication area of the macro-cell base station 10, and a server apparatus 40 capable of communicating with each of the base stations 10 and 20 via a communication line. A cell (hereinafter called appropriately as "small cell") 20A that is a radio communication area of the small-cell base station 20 is included in the cell 10A of the macro-cell base station 10.

It is noted that, in recent years, in large urban areas, since communication traffic is increasing rapidly in indoor offices of middle to high-rise buildings, a means of transporting communication traffic to a height direction in high efficiency are demanded. Therefore, as shown in FIG. 2, a three-dimensional space cell configuration is effective, in which the small cell 20A is disposed in a height direction in a building.

In FIG. 1, a mobile station apparatus 30 is a user terminal equipment (MUE) connected with the macro-cell base station 10 locating in the cell 10A of the macro-cell base station 10, and the mobile station apparatus 30 is in a state capable of radio communication for a telephone or data communication, etc. via the macro-cell base station 10. Since this mobile station apparatus 30 is located at a position near the boundary portion between the macro cell 10A and the small cell 20A, the mobile station apparatus 30 is in a situation susceptible to interference from the small cell 20A.

The mobile station apparatus 31 is a user terminal equipment (HUE) connected with the small-cell base station 20 locating in an outer edge portion of the cell 20A of the small-cell base station 20, and the mobile station apparatus 31 is in a state capable of radio communication for a telephone or data communication, etc. via the small-cell base station 20. Since this mobile station apparatus 31 is located at a position near the boundary portion between the small cell 20A and the macro cell 10A, the mobile station apparatus 31 is in a situation susceptible to interference from the macro cell 10A.

When locating in the macro cell 10A or the small cell 20A, the mobile station apparatuses 30 and 31 can perform a radio communication with a macro-cell base station or a small-cell base station corresponding to the cell in which the respective mobile station apparatus locates, by using a predetermined communication system and radio communication resource. The mobile station apparatuses 30 and 31 are configured with, for example, hardware such as a computer apparatus having a CPU, a memory, etc., an external communication interface section for a core network and a radio communication section, and the mobile station apparatus 30 and 31 can perform a radio communication with the base stations 10 and 20 etc. by executing a predetermined program.

The macro-cell base station 10 is a base station for wide area which covers a macro cell being as a normal wide area with a radius from about several hundred meters to several kilometers, which may be referred to as "macro-cell base station", "Macro e-Node B", "MeNB", or the like. The macro-cell base station 10 is connected to other base stations with for example a wired communication link and can communicate via a predetermined communication interface. The macro-cell base station 10 is also connected to a core network of the mobile communication network via a line-termination unit and a communication line 50 such as a leased line, and the macro-cell base station 10 can communicate with various types of nodes such as a server apparatus 40 on the core network by a predetermined communication interface.

Unlike the macro-cell base station for wide area, the small-cell base station 20 is a small-capacity base station which can be disposed indoors such as an ordinary home, shop, office, etc. and has a radio-communication range of about several meters to several hundred meters. Since the small-cell base station 20 is disposed so as to cover an area smaller than the area covered by the macro-cell base station for wide area in the mobile communication network, the small-cell base station may be referred to as "femto base station", "Home e-Node B", "Home eNB", or the like. The small-cell base station 20 is also connected to the core network of the mobile communication network via a line-termination unit and a communication line 51 such as a public board-band communication line including an ADSL (Asymmetric Digital Subscriber Line), an optical line, etc. and can communicate with various types of nodes such as a server apparatus 40 on the core network by a predetermined communication interface.

The base station apparatus of each of the macro-cell base station 10 and the small-cell base station 20 is configured with, for example, hardware such as a computer apparatus having a CPU, a memory, etc., an external communication interface section for a core network and a radio communication section, and can perform various types of processing to suppress an interference as stated below and can perform a radio communication with the mobile station apparatuses 30 and 31 by using a predetermined communication system and a radio communication resource by executing a predetermined program.

The base station apparatus is provided with, for example, an antenna, a radio signal path switching section, a transmission and reception sharing device (DUP: Duplexer), a downlink radio receiving section, an OFDM (Orthogonal Frequency Division Multiplexing) demodulation section, an interference measuring section, an uplink radio receiving section and a SC-FDMA (Single-Carrier Frequency-Division Multiple Access) demodulation section, etc. The base station apparatus is also provided with an OFDM modulation section, a downlink radio transmitting section, a control section and a synchronization section, etc.

The downlink radio receiving section receives a radio signal including notification information modulated with an OFDM system for downlink specified by the LTE from the neighboring base station 10 via an antenna and a radio signal path switching section. The OFDM demodulation section acquires a receiving signal by demodulating the radio signal modulated with the OFDM system. The interference measuring section functions as a measuring means for measuring an interference signal level. This interference measuring section measures a signal level of an interference wave (hereinafter called as "interference signal level") transmitted from the neighboring base station based on the receiving signal demodulated by the OFDM demodulation section and passes the measurement result of the interference signal level to the control section.

The synchronization section performs a synchronization capturing process being as a time synchronization process for synchronizing in time with the neighboring base station. As a method of time synchronization process, a "GPS method", "network method" and "air listening method", or the like can be used. The GPS method is a method of synchronizing based on time information of a GPS signal received by a GPS receiver. The network method is a method of synchronizing based on time information received via the mobile communication network. The air listening method is a method of detecting a downlink signal from the neighboring base station and synchronizing with the signal as a standard of synchronization.

The SC-FDMA demodulation section performs a demodulation process with the SC-FDMA system for a reception signal received by the uplink radio receiving section and passes the demodulated data to the control section. The OFDM modulation section receives a data of downlink signal to be transmitted to the user terminal equipment locating in the cell of its own station, from the control section, and modulates the data with the OFDM system. When the base station apparatus receives information on a target subframe to be stopped for transmission, from the server apparatus 40, the OFDM modulation section is controlled so as to stop downlink transmission only for the specific subframe in a radio communication frame. The downlink radio transmitting section transmits a transmission signal modulated by the OFDM modulation section via the transmission and reception sharing device, the radio signal path switching section and the antenna.

The control section of the base station apparatus is configured with, for example, a computer device, controls each section, and performs various kinds of processes by loading and executing a predetermined program. The control section cooperates with the external communication interface section and functions as means of transmitting information on the interference signal level measured by the interference measuring section or noticed by the mobile station apparatus and information on the traffic in the base station, to the server apparatus 40, collaborate with an external communication interface section. The control section also cooperates with the external communication interface section and functions as means of receiving ABS pattern information that is information on a target subframe to be stopped for transmission, from the server apparatus 40. The control section also functions as means of controlling so as to stop a downlink transmission in the specific target subframe to be stopped for transmission based on the information (ABS pattern information) on of the target subframe to be stopped for transmission which is received from the server apparatus 40 or determined by the base station apparatus.

The control section of the base station apparatus, when the ABS pattern is to be switched, also functions as means of changing an MCS index value to be determined by an adaptive modulation control, for a communication within a predetermined period of time on or before a switching time of the switching, with respect to a subframe in which a communication with the mobile station apparatus is allowed before switching the ABS pattern, when performing the first transmission or HARQ retransmission of data transmission. Herein, the MCS index value, for example, may be changed to a value lower than the MCS index value to be determined by the adaptive modulation control so as to complete data communications with the mobile station apparatus or the HARQ retransmission of the data transmission before switching the ABS pattern.

It is noted that although the macro-cell base station 10 and the small-cell base station 20 are shown one by one in FIG. 1, the number of the macro-cell base station 10 and the small-cell base station 20 may be plural, respectively. Although the user terminal equipment located in each of the macro-cell 10A and the small-cell 20A is shown one by one in FIG. 1, a plurality of the user terminal equipment may be located in each of the cells 10A and 20A.

The server apparatus 40 is configured with, for example, hardware such as a computer device having a CPU, memories, etc., an external communication interface section for the core network. The server apparatus 40 is capable of performing various kinds of processes in order to reduce interference described below, and capable of communicating with the macro-cell base station 10 and the small-cell base station 20 via the communication lines 50 and 51, by executing a predetermined program. The computer apparatus of the server apparatus 40 functions as means of determining whether stop or start of a downlink transmission from another neighboring base station is necessary or not, with respect to at least one subframe within a radio communication frame of the downlink transmission to the user terminal equipment based on interference signal level information and traffic information received from the base station apparatus. When the computer apparatus of the server apparatus 40 determines that the stop or start of the downlink transmission is necessary, the computer apparatus also functions as means of determining at least one subframe to be stopped or started for transmission within the radio communication frame. The computer apparatus of the server apparatus 40 also cooperates with the external communication interface section and functions as means of receiving the interference signal level information and the traffic information in the base station apparatus from the base station apparatus and means of transmitting the information on the determined target subframe to be stopped or started for transmission to another neighboring base station apparatus which is an interference source.

In the description hereinafter, inter-cell interference controls in the mobile communication system having aforementioned configuration will be described.

In order to cope with a rapid increase in communication traffic in recent years, it is effective to apply an overlay cell configuration in which the small cell 20A is superimposed on the macro cell 10A. However, in the overlay cell configuration, since interference occurs between the macro cell 10A and the small cell 20A, between the macro cell 10A and the macro cell 10A and between the small cell 20A and the small cell 20A, it is necessary to control the interference to maximize an application effect. As an interference control method, an eICIC (enhanced Inter-Cell Interference Coordination) technique of the LTE-Advanced standards is effective.

Figure 3:
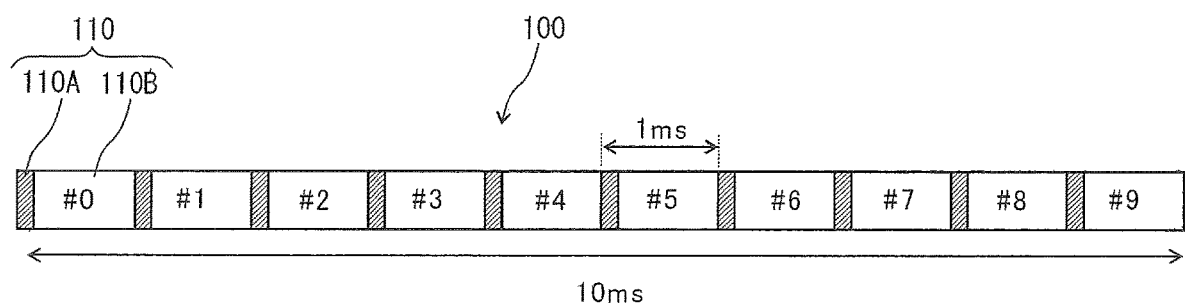
FIG. 3 is an illustration showing an example of a format of a radio communication frame of an LTE downlink.

FIG. 3 is an illustration showing an example of a format of a radio communication frame of an LTE downlink.

As shown in FIG. 3, a radio communication frame 100 with a predetermined length (10 ms in the illustrated example), which is one unit of an LTE downlink signal, is configured with a predetermined number of subframes 110 (ten subframes in the illustrated example) of a predetermined respective length (1.0 ms in the illustrated example). Each subframe 110 is divided into a predetermined number of slots (two slots in the illustrated example) of a predetermined respective length (0.5 ms in the illustrated example). Since a TTI (Transmission Time Interval), which is the minimum unit of time for scheduling of the LTE downlink, is 1 subframe, for each substrate, a resource block (RB), which is the minimum unit of radio resource, is allocated to the scheduled user terminal equipment.

In the radio communication frame 100 in FIG. 3, for each of the second (#1), third (#2), fourth (#3), seventh (#6), eighth (#7) and ninth (#8) arrangement positions from the head, it is capable of allocating a subframe in which a transmission of a cell-specific reference signal (CRS) can be stopped. This subframe in which a transmission of a cell-specific reference signal (CRS) can be stopped is the MBSFN (Multicast Broadcast Single Frequency Network) subframe conforming to the LTE-Advanced standards. For each of other arrangement positions of the radio communication frame 100, that is, the first (#0), fifth (#4), sixth (#5) and tenth (#9) arrangement positions from the head, it is not capable of setting the MBSFN subframe, and capable of setting only an ordinary subframe in which a transmission of a cell-specific reference signal (CRS) cannot be stopped.

Figure 4:
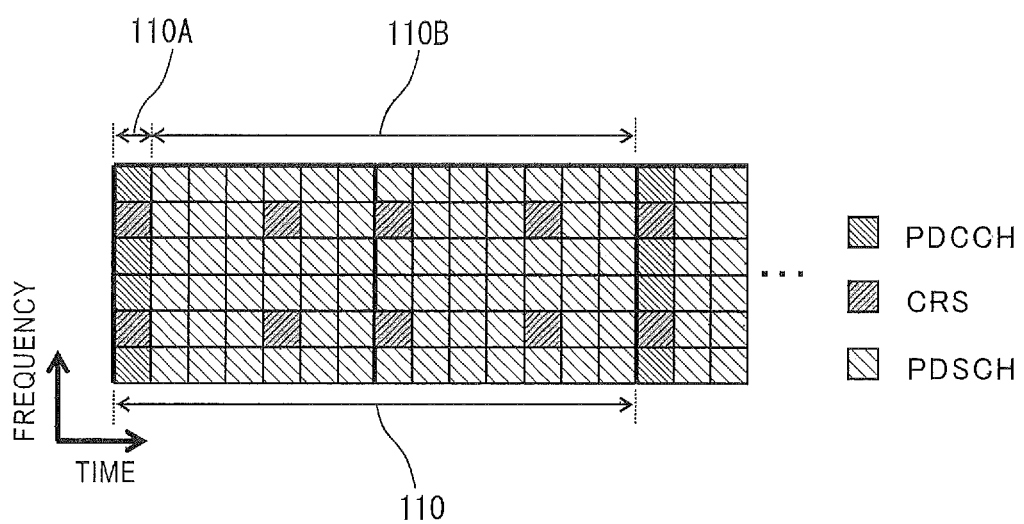
FIG. 4 is an illustration showing an example of a format of a subframe forming a radio communication frame.

FIG. 4 is an illustration showing an example of a format of a subframe forming a radio communication frame. In FIG. 4, each subframe 110 is composed of, for example, a total of 168 REs (Resource Elements) that are 12 subcarriers (15 kHz) in the frequency direction and 14 OFDM symbols in the time axis direction. Herein, "symbol" is one unit of information transmitted by radio communication. One symbol is generated by one modulation of information to be transmitted, and the information amount (number of bit) of one symbol is determined by the modulation system. Scheduling for defining which frequency/time resource is mapped for respective user terminal equipments, what type of modulation format (modulation system, coded rate) is used in data signal to respective user terminal equipments, etc. is performed for each subframe, and the result of scheduling is notified to the user terminal equipment.

As shown in FIG. 4, each subframe 110 has a control area 110A of the head part in which a RE for downlink L1/L2 control channel signal is mapped, and a data area 110B in which a RE for data channel signal and upper control channel signal is mapped.

In the control area 110A of the subframe 110, a PDCCH (Physical Downlink Control Channel) being as an L1/L2 control channel is set. The PDCCH is used for transmission of control information (DCI: Downlink Control Information) such as a determination of scheduling for uplink and downlink and a power control command for uplink (uplink communication), etc. The DCI includes an allocation of downlink scheduling including control information on a physical downlink shared channel (PDSCH: Physical Downlink Shared Channel) resource designator, a transmission format, HARQ information and a spatial multiplex. The DCI also includes an uplink-scheduling grant including a physical uplink shared channel (PUSCH: Physical Uplink Shared Channel) resource designator, a transmission format and HARQ-related information.

A PDSCH is set in the data area 110B of the subframe 110. The PDSCH is a physical channel for transmitting a downlink data and supports a MIMO multiplexing of a maximum of 4 layers in LTE and a MIMO multiplexing of a maximum of 8 layers in LTE-Advanced, in addition to a MIMO diversity, as a MIMO transmission system. An SIB being as broadcast information other than an MIB, paging information being as a paging upon incoming call, and other upper-layer control messages such as control information of an RRC (Radio resource Control protocol) layer are also transmitted by the PDSCH. The user terminal equipment decodes the PDSCH based on information such as a radio-resource allocation position, a modulation system and a data size (TB: Transport Block size).

In LTE, cell-specific reference signals (CRSs) are dispersed and regularly arranged in the 1st, 5th, 8th and 12th OFDM symbols among the 14 OFDM symbols in time domain in the subframe 110. This reference signal CRS plays two roles as a reference signal for measuring channel state information (CSI: channel state information) and a reference signal for data demodulation in the user terminal equipment. Depending on a cell ID, different scrambling and frequency shift of subcarrier positions to be mapped are applied to the reference signal CRS. As described above, the transmission of reference signal CRS mapped in the normal subframe cannot be stopped by the ABS, and the transmission of reference signal CRS mapped in the MBSFN subframe can be stopped by the ABS.

Figure 5:
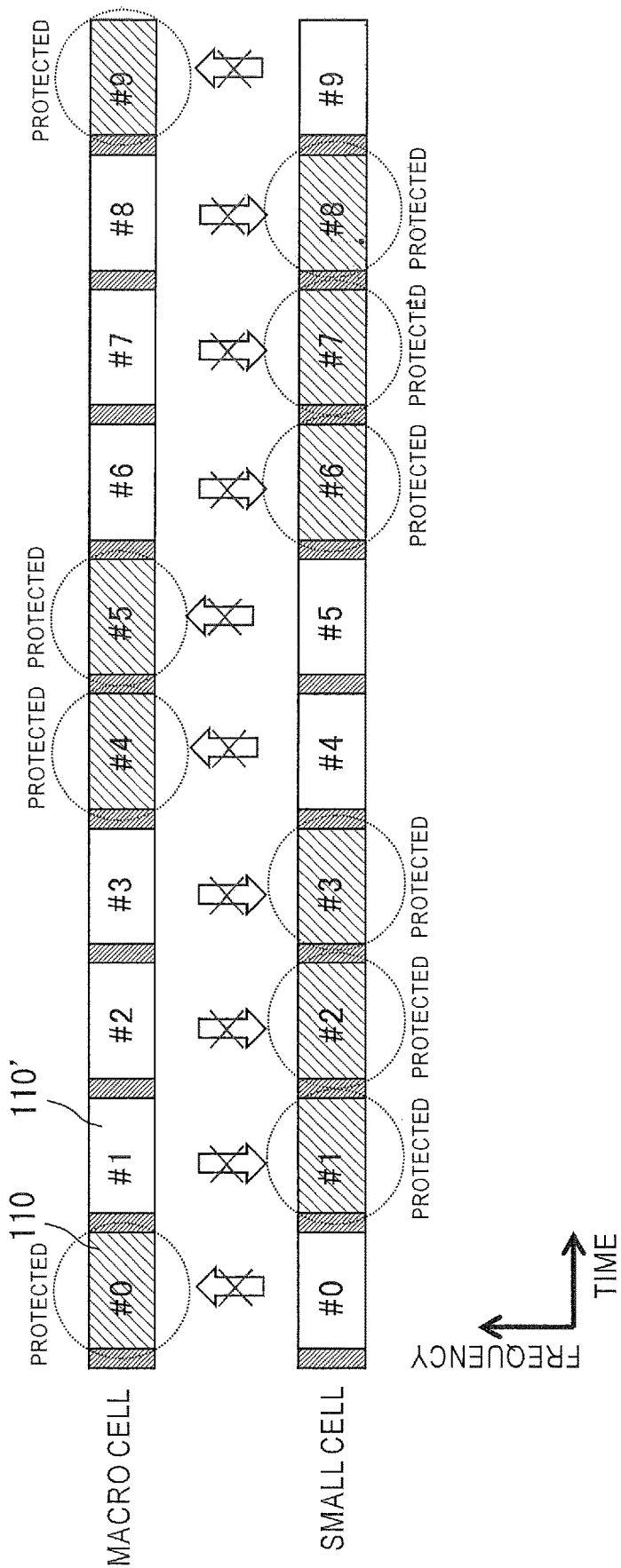
FIG. 5 is an illustration showing an example of a situation of transmission stops in an inter-cell interference control technique using ABSs.

FIG. 5 is an illustration showing an example of a situation of transmission stops according to an inter-cell interference control technique using ABSs. In the ABS, it is capable of reducing an interference in the user terminal equipment connected with the small cell, by stopping signal transmission in part of subframes (in the example of the figure, the subframes of #1 to #3 and #6 to #8) of the macro cell. It is also capable of reducing an interference in the user terminal equipment connected with the macro cell, by stopping signal transmission in part of subframes (in the example of the figure, the subframes of #0, #4, #5 and #9) of the small cell.

In the mobile communication system to which the inter-cell interference control technique using the ABS is applied, when performing an HARQ retransmission control when a block error occurs in a subframe, a communication delay may occur as described above. For example, by switching the ABS pattern (change of the ABS), there is a case that the subframe scheduled for HARQ retransmission is switched from the normal subframe to the ABS subframe in which a signal transmission is not performed. In this case, an HARQ retransmission cannot be performed in the subframe switched to the ABS, the HARQ retransmission is changed to an ARQ retransmission in radio link control (RLC), and a communication delay occurs.

Therefore, in the present embodiment, when the ABS pattern is to be switched, for communication before the switching time and in a particular period of time, a MCS (Modulation and Coding Scheme) index value to be determined by the adaptive modulation control is changed for a communication within a predetermined period of time on or before a switching time of the switching, with respect to a subframe in which a communication with a mobile station apparatus is allowed before switching the ABS pattern.

Figure 6:
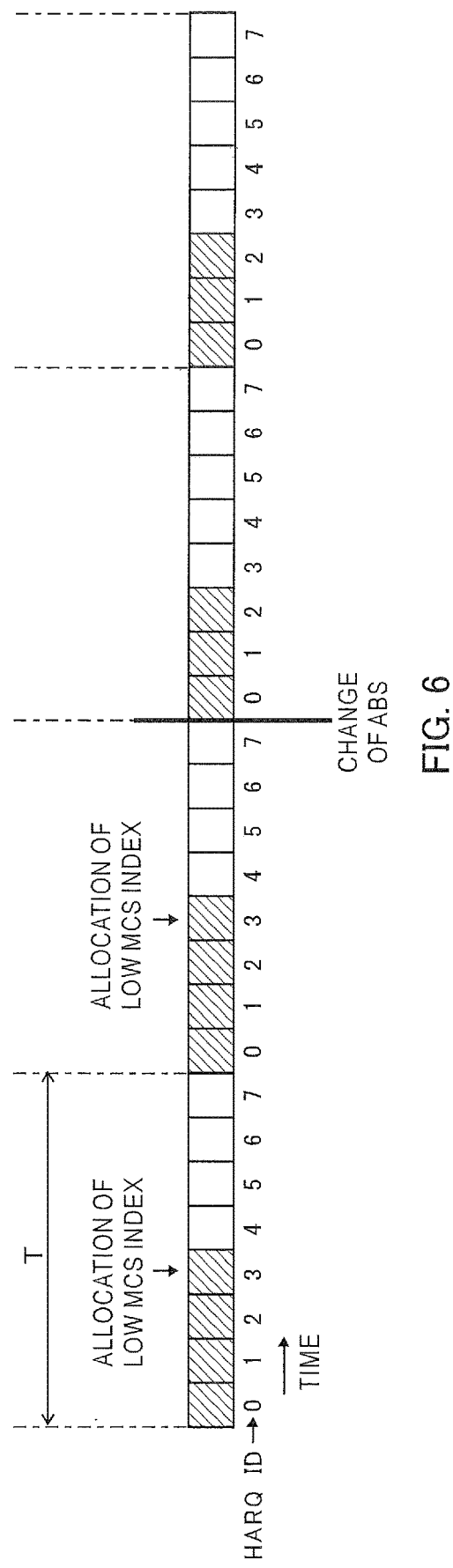
FIG. 6 is an illustration showing an example of an adaptive modulation control when switching an ABS pattern in a base station apparatus according to the present embodiment.

FIG. 6 is an illustration showing an example of an adaptive modulation control when switching an ABS pattern in a base station apparatus according to the present embodiment. Between the base station apparatus and the mobile station apparatus in the present embodiment, an HARQ retransmission control is performed in a predetermined HARQ cycle T with a predetermined number of subframes as one unit. In the illustrated example, the HARQ retransmission control is performed in an HARQ cycle T of 8 m with 8 subframes as one unit. The HARQ ID (=0 to 7) in the figure is HARQ identification information (number) for identifying the subframe within the HARQ cycle T used in the HARQ retransmission control.

In the example of FIG. 6, for the subframe of the HARQ ID ("3" in the illustrated example) in which an HARQ retransmission cannot be performed after switching the ABS pattern (after changing the ABS), the value of MCS index M, which is a communication parameter affecting the occurrence of a block error, is changed and allocated to a value lower than the initial set value. By lowering this value of MCS index M, with respect to the subframe of the HARQ ID (=3), since the initial transmission or the retransmission of the data communication with the mobile station apparatus can be completed before switching the ABS pattern (before changing the ABS) and retransmission by the ARQ can be avoided, it is capable of preventing a communication delay.

It is noted that, with respect to which HARQ retransmission cannot be performed in a subframe of HARQ ID due to the switching of ABS pattern (the change of ABS), for example, it is capable of determining based on the ABS pattern information received from the server apparatus 40 or determined by the base station apparatus before the predetermined time (for example, one minute before) for the switching.

In the example of FIG. 6, the subframe, for which the value of MCS index M is changed to the value lower than the initial set value, is only the substrate in which the HARQ retransmission cannot be performed after switching the ABS pattern among the four signal-transmission target subframes before switching the ABS pattern. On the other hand, the value of MCS index M may be uniformly changed to a value lower than the initial set value for all of the four signal-transmission target subframes before switching the ABS pattern.

Figure 7:
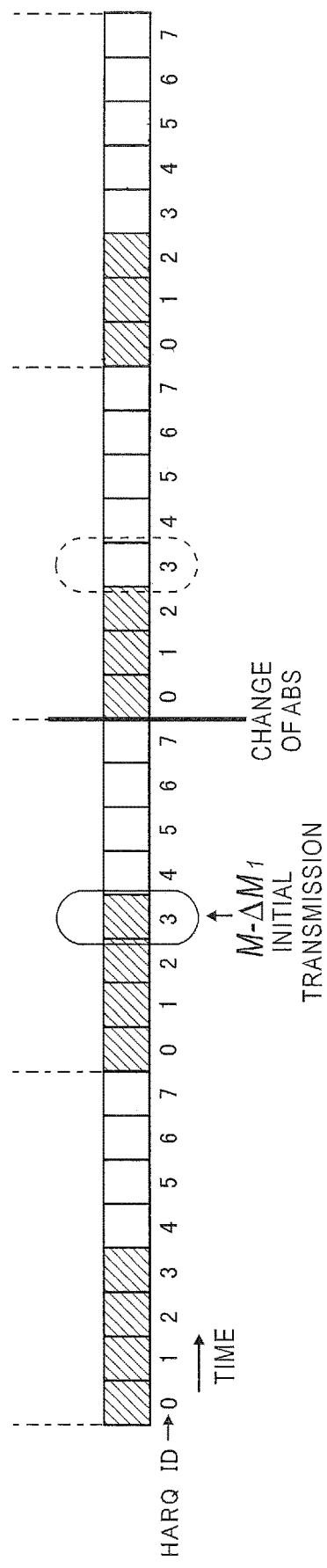
FIG. 7 is an illustration showing another example of an adaptive modulation control when switching an ABS pattern in a base station apparatus according to the present embodiment.

FIG. 7 is an illustration showing another example of an adaptive modulation control when switching an ABS pattern in a base station apparatus according to the present embodiment.

The example of FIG. 7 is an example in which the number of remaining transmittable times before switching the ABS pattern is once, and this example can be applied to each of uplink (uplink communication) and downlink (downlink communication). In the present example, with respect to the subframe of HARQ ID ("3" in the illustrated example) in which transmission (initial transmission, HARQ retransmission) cannot be performed after switching the ABS pattern (after changing the ABS), an offset ($-\Delta M_1$) is added to the value M of the MCS index value to be determined by the adaptive modulation control so that the data communication with the mobile station apparatus is completed in the initial transmission before switching the ABS pattern.

As described above, according to the present example, data communication with the mobile station apparatus can be completed by the initial transmission before switching the ABS pattern and the retransmission by ARQ can be prevented, by the aforementioned transmission control in the uplink or the downlink. Therefore, it is capable of preventing occurrence of a communication delay when performing the data communication with the inter-cell interference control technique using ABS.

It is noted that, even in the example of FIG. 7, for all of the four target subframes to be used for signal transmission before switching the ABS pattern, the offset $(-\Delta M_1)$ may be uniformly added to the value M of the MCS index to be determined by the adaptive modulation control.

Figure 8:
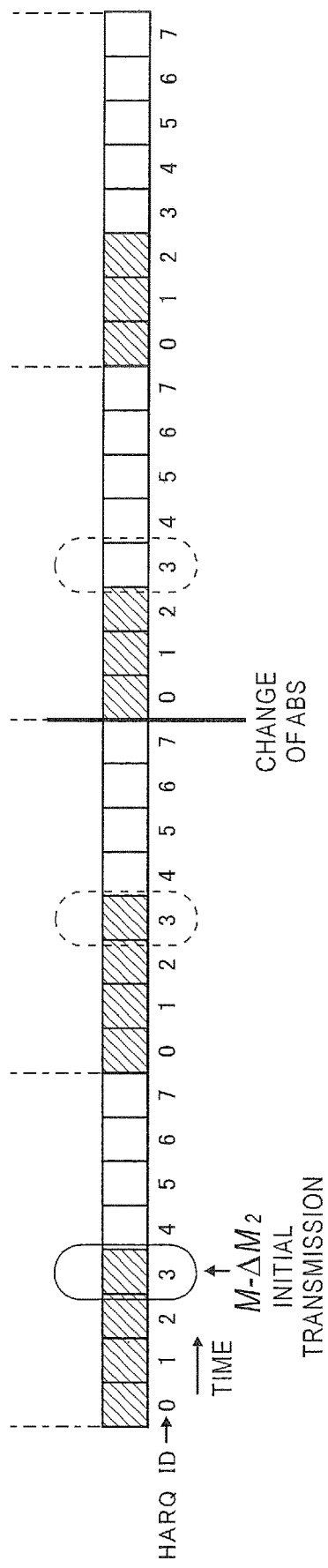
FIG. 8 is an illustration showing yet another example of an adaptive modulation control when switching an ABS pattern in a base station apparatus according to the present embodiment.

FIG. 8 is an illustration showing yet another example of an adaptive modulation control when switching an ABS pattern in a base station apparatus according to the present embodiment.

The example of FIG. 8 is an example in which the number of remaining transmittable times before switching the ABS pattern is two times and can be applied to each of the uplink and the downlink. In the present example, with respect to the subframe of HARQ ID ("3" in the illustrated example) in which transmission (initial transmission, HARQ retransmission) cannot be performed after switching the ABS pattern (after changing the ABS), an offset $(-\Delta M_2)$ is added to the value M of the MCS index to be determined by the adaptive modulation control so that the data communication with the mobile station apparatus is completed only in the initial transmission, or in the initial transmission and one HARQ retransmission, before switching the ABS pattern.

As described above, according to the present example, data communication with the mobile station apparatus can be completed by the initial transmission, or by the initial transmission and one HARQ retransmission before switching the ABS pattern and the retransmission by ARQ can be prevented, by the aforementioned transmission control in the uplink or the downlink. Therefore, it is capable of preventing occurrence of a communication delay when performing the data communication with the inter-cell interference control technique using ABS.

It is noted that, even in the example of FIG. 8, for all of the four target subframes to be used for signal transmission before switching the ABS pattern, the offset $(-\Delta M_2)$ may be uniformly added to the value M of the MCS index to be determined by the adaptive modulation control.

Moreover, in the example of FIG. 8, when the transmission is completed by the initial transmission in case of the number of remaining transmittable times is two times, the next transmission in the subframe of HARQ ID ("3" in the illustrated example), in which a transmission (initial transmission, HARQ retransmission) after switching the ABS pattern cannot be performed, is the initial transmission in which the number of remaining transmittable times is once. Therefore, the same processing as in the example of FIG. 7 may be performed.

Figure 9:
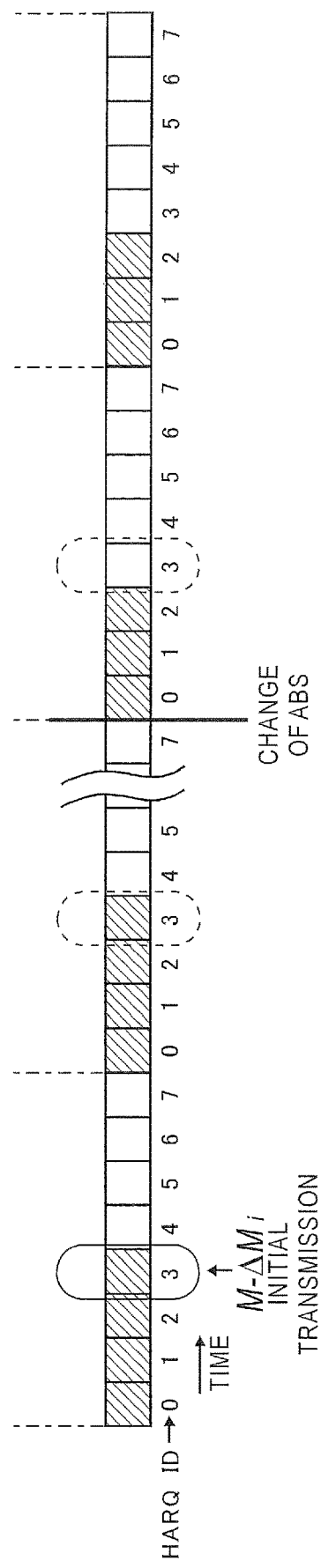
FIG. 9 is an illustration showing yet another example of an adaptive modulation control when switching an ABS pattern in a base station apparatus according to the present embodiment.

FIG. 9 is an illustration showing yet another example of an adaptive modulation control when switching an ABS pattern in a base station apparatus according to the present embodiment.

The example of FIG. 9 is an example in which the number of remaining transmittable times i before switching the ABS pattern is any number of times equal to or less than the maximum number of total transmission times (upper limit value) which is the sum of the initial transmission and the maximum number of HARQ retransmission times and is set in the base station. The present example can be applied to each of the uplink and the downlink. In the present example, with respect to the subframe of HARQ ID ("3" in the illustrated example) in which transmission (initial transmission, HARQ retransmission) cannot be performed after switching the ABS pattern (after changing the ABS), an offset $(-\Delta M_i)$ is added to the value M of MCS index value to be determined by the adaptive modulation control, in accordance with the predetermined number of remaining transmittable times i, so that the data communication with the mobile station apparatus is completed only in the initial transmission, or in the initial transmission and the number of times j (j is a natural number smaller than i) of HARQ retransmission, before switching the ABS pattern.

In the example of FIG. 9, the absolute value $(-\Delta M_i)$ of the offset which is added to the value M of MCS index to be determined by the adaptive modulation control, is set in accordance with the number of remaining transmittable times (i) before switching the ABS pattern. For example, when the maximum number of total transmission times is five times as shown in Table. 1, the absolute value $(-\Delta M_i)$ of the offset is set in accordance with the number of remaining transmittable times (i=1 to 5) which is equal to or less than the foregoing maximum number of total transmission. Herein, for example, when the number of remaining transmittable times i is once, since only one of the initial transmission can be transmitted before switching the ABS pattern, the absolute value $(-\Delta M_1)$ of the offset is set to be large so that the data communication with the mobile station apparatus is completed by one transmission. On the other hand, when the number of remaining transmittable times i is four times, since it is capable of transmitting four times before switching the ABS pattern, the absolute value $(-\Delta M_4)$ of the offset is set to be small so that the data communication with the mobile station apparatus is completed by the four times of transmission. Moreover, when the number of remaining transmittable times i is five times, since the data communication with the mobile station apparatus is completed by five transmissions before switching the ABS pattern even with the initial setting value of the MCS index M, the offset need not be added.

TABLE 1

| The number of remaining transmittable times (i) | Offset of MCS index $(\Delta M_i)$ |
|---|---|
| 1 | 4 |
| 2 | 3 |
| 3 | 2 |
| 4 | 1 |
| 5 | 0 |

As described above, according to the present example, by the transmission control in the uplink or the downlink, data communication with a mobile station apparatus can be completed by only the initial transmission or by the initial transmission and j−1 times of HARQ retransmissions before switching the ABS pattern and the retransmission by ARQ can be prevented. Therefore, it is capable of preventing occurrence of a communication delay when performing the data communication with the inter-cell interference control technique using ABS.

It is noted that, even in the example of FIG. 9, for all of the four target subframes to be used for signal transmission before switching the ABS pattern, the offset $(-\Delta M_2)$ may be uniformly added to the value of the MCS index value M to be determined by the adaptive modulation control.

Moreover, in the example of FIG. 9, when the transmission is completed by the initial transmission in case of the number of remaining transmittable times is i times, the next transmission in the subframe of HARQ ID ("3" in the illustrated example), in which a transmission (initial transmission, HARQ retransmission) after switching the ABS pattern cannot be performed, is the initial transmission in which the number of remaining transmittable times is i−1 times. Therefore, with respect to the foregoing subframe (HARQ ID=3 in the illustrated example), an offset ($-\Delta M_{i-1}$) corresponding to the case, in which the number of remaining transmittable times is i−1 times, may be added to the value M of the MCS index to be determined by the adaptive modulation control, and the same processing in the example of FIG. 9 may be performed.

Figure 10:
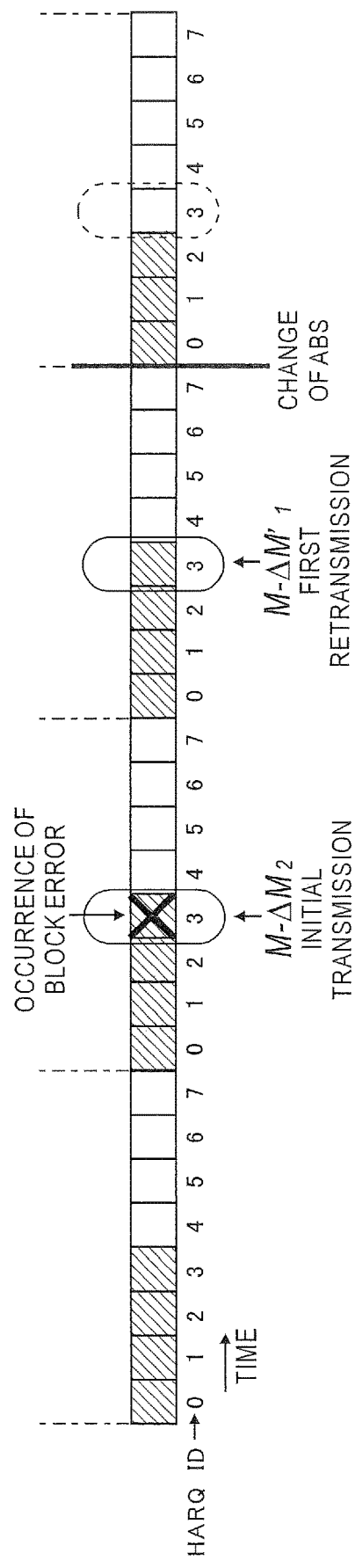
FIG. 10 is an illustration showing yet another example of an adaptive modulation control when switching an ABS pattern in a base station apparatus according to the present embodiment.

FIG. 10 is an illustration showing yet another example of an adaptive modulation control when switching an ABS pattern in a base station apparatus according to the present embodiment. The example of FIG. 10 is an example of downlink in which an MCS index M when performing an HARQ retransmission can be changed and the number of remaining transmittable times before switching the ABS pattern is two times.

In the present example, with respect to the subframe of HARQ ID ("3" in the illustrated example) in which transmission (initial transmission, HARQ retransmission) after switching the ABS pattern (after changing the ABS) cannot be changed, an offset ($-\Delta M_2$) corresponding to the case, in which the number of remaining transmittable times is two times, is added to the value M of the MCS index to be determined by the adaptive modulation control, and the initial transmission is performed.

In the present example, since a block error occurs when performing the initial transmission, an HARQ retransmission is performed with respect to the foregoing subframe (HARQ ID=3 in the illustrated example). At the time of this HARQ retransmission, since the number of remaining retransmittable times before switching the ABS pattern becomes once, an offset ($-\Delta M'_1$) corresponding to the case, in which the number of remaining retransmittable times is once, is added to the value M of the MCS index value to be determined by the adaptive modulation control.

As described above, according to the present example, by the foregoing transmission control in the downlink, since data communication with the mobile station apparatus can be completed by the initial transmission and one HARQ retransmission before switching the ABS pattern and the retransmission by ARQ can be prevented, it is capable of preventing occurrence of a communication delay when performing the data communication with the inter-cell interference control technique using ABS.

Figure 11:
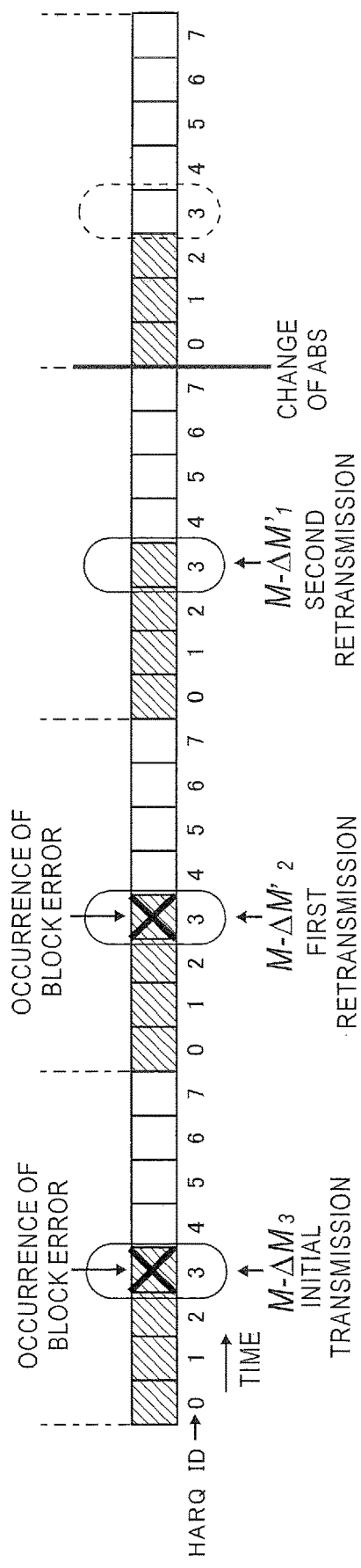
FIG. 11 is an illustration showing yet another example of an adaptive modulation control when switching an ABS in a base station apparatus according to the present embodiment.

FIG. 11 is an illustration showing yet another example of an adaptive modulation control when switching an ABS pattern in a base station apparatus according to the present embodiment. The example of FIG. 11 is an example of downlink in which an MCS index M when performing an HARQ retransmission can be changed and the number of remaining transmittable times before switching the ABS pattern is three times.

In the present example, with respect to the subframe of HARQ ID ("3" in the illustrated example) in which transmission (initial transmission, HARQ retransmission) after switching the ABS pattern (after changing the ABS) cannot be performed, an offset ($-\Delta M_3$) corresponding to the case, in which the number of remaining transmittable times is three times, is added to the value M of the MCS index to be determined by the adaptive modulation control, and the initial transmission is performed.

In the present example, since a block error occurs when performing the initial transmission, the first HARQ retransmission is performed with respect to the foregoing subframe (HARQ ID=3 in the illustrated example). At the time of the first HARQ retransmission, since the number of remaining retransmittable times before switching the ABS pattern becomes once, an offset ($-\Delta M'_2$) corresponding to the case, in which the number of remaining retransmittable times is two times, is added to the MCS index value M to be determined by the adaptive modulation control.

Moreover, in the present example, since a block error also occurs when performing the first HARQ retransmission, the second HARQ retransmission is performed with respect to the foregoing subframe (HARQ ID=3 in the illustrated example). At the time of this second HARQ retransmission, since the number of remaining retransmittable times before switching the ABS pattern becomes once, an offset ($-\Delta M'_1$) corresponding to the case, in which the number of remaining retransmittable times is once, is added to the value M of the MCS index to be determined by the adaptive modulation control.

As described above, according to the present example, by the foregoing transmission control in the downlink, since data communication with the mobile station apparatus can be completed by the initial transmission and two HARQ retransmissions before switching the ABS pattern and the retransmission by ARQ can be prevented, it is capable of preventing occurrence of a communication delay when performing the data communication with the inter-cell interference control technique using ABS.

Figure 12:
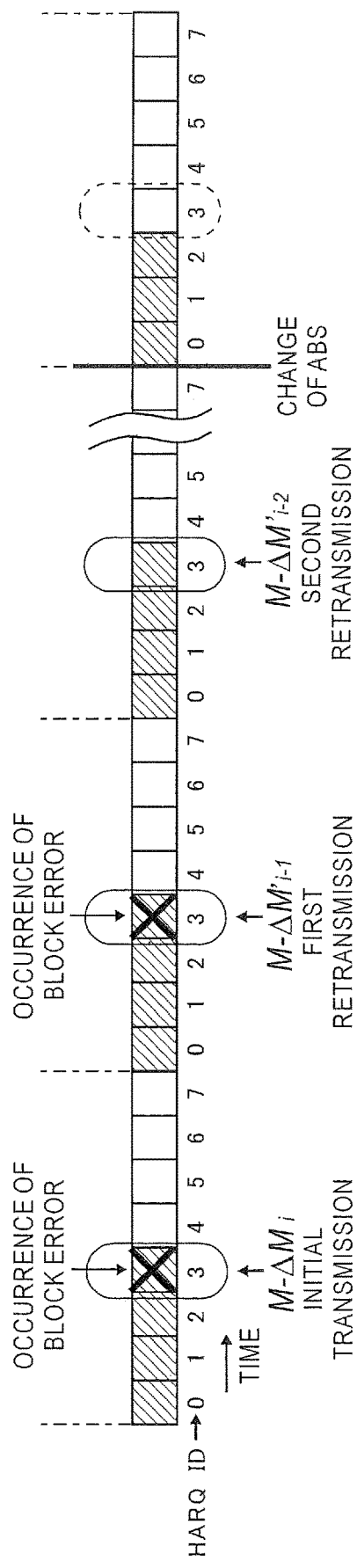
FIG. 12 is an illustration showing yet another example of an adaptive modulation control when switching an ABS pattern in a base station apparatus according to the present embodiment.
Figure 13A:
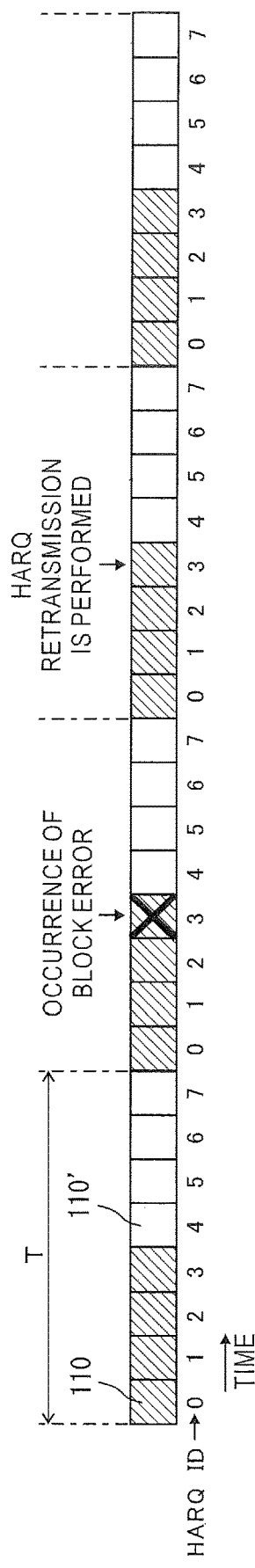
FIG. 13A is an illustration showing a conventional HARQ retransmission control.
Figure 13B:
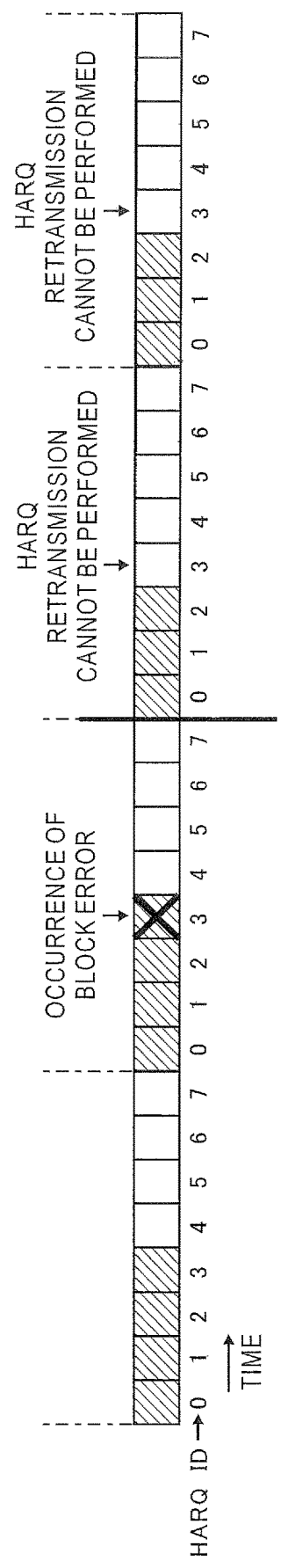
FIG. 13B is an illustration of a problem when combining a conventional HARQ retransmission control and an inter-cell interference control technique using ABSs.

FIG. 12 is an illustration showing yet another example of an adaptive modulation control when switching an ABS pattern in a base station apparatus according to the present embodiment. The example of FIG. 12 is an example of downlink in which an MCS index M when performing an HARQ retransmission can be changed and the number of remaining transmittable times before switching the ABS pattern is i times.

In the present example, with respect to the subframe of HARQ ID ("3" in the illustrated example) in which transmission (initial transmission, HARQ retransmission) after switching the ABS pattern (after changing the ABS) cannot be performed, an offset ($-\Delta M_i$) corresponding to the case, in which the number of remaining transmittable times is i times, is added to the value M of the MCS index to be determined by the adaptive modulation control, and initial transmission is performed.

In the present example, since a block error occurs when performing the initial transmission, the first HARQ retransmission is performed with respect to the foregoing subframe (HARQ ID=3 in the illustrated example). At the time of the first HARQ retransmission, since the number of remaining retransmittable times before switching the ABS pattern becomes j−1 times, an offset ($-\Delta M'_{i-1}$) corresponding to the case, in which the number of remaining retransmittable times is i−1 times, is added to the value M of the MCS index to be determined by the adaptive modulation control.

Moreover, in the present example, since a block error also occurs when performing the first HARQ retransmission, the second HARQ retransmission is performed with respect to the foregoing subframe (HARQ ID=3 in the illustrated example). At the time of this second HARQ retransmission, since the number of remaining retransmittable times before switching the ABS pattern becomes i−2 times, an offset ($-\Delta M'_{i-2}$) corresponding to the case, in which the number of remaining retransmittable times is i−2 times, is added to the value M of the MCS index value to be determined by the adaptive modulation control.

As described above, according to the present example, by the foregoing transmission control in the downlink, since data communication with the mobile station apparatus can be completed by the initial transmission and two HARQ retransmissions before switching the ABS pattern and the retransmission by ARQ can be prevented, it is capable of preventing occurrence of a communication delay when performing the data communication with the inter-cell interference control technique using ABS.

It is noted that, in each of the embodiments, the absolute value ($\Delta M_i$) of the offset which is added to the MCS index value M to be determined by the adaptive modulation control when performing the initial transmission may be determined based on the MCS index value M to be determined by the adaptive modulation control and the rank that is the number of spatial multiplexing in the radio communication with the mobile station apparatus 30 and 31. For example, when the ranks are different from each other even if each of the MCS index M and the number of remaining transmittable times i is the same, different offsets ($\Delta M_i$) may be added for every ranks.

In each of the aforementioned embodiments, the absolute value ($\Delta M'_i$) of the offset which is added to the MCS index value M to be determined by the adaptive modulation control when performing the retransmission may be determined based on the MCS index value M to be determined by the adaptive modulation control and the rank that is the number of spatial multiplexing in the radio communication with the mobile station apparatus 30 and 31. For example, when the ranks are different from each other even if each of the MCS index M and the number of remaining retransmittable times i is the same, different offsets ($\Delta M'_i$) may be added for every ranks.

When the foregoing value of MCS index M before switching the ABS pattern cannot be changed to the value by which data transmission (initial transmission, HARQ retransmission) with the mobile station apparatus cannot be completed before switching the ABS pattern, allocation of radio communication resource to the mobile station apparatus may not be performed. By not allocating the radio communication resource in this way, it is capable of preventing a communication that is expected to switch from the HARQ retransmission control to the ARQ retransmission control.

In the aforementioned embodiment, although the cases of reducing the inter-cell interference between the macro-cell base station 10 and the small-cell base station 20 where the cells overlap each other is described, the adaptive modulation control when switching the ABS pattern can be similarly applied to case of reducing the inter-cell interference between the macro-cell base stations 10 and between the small-cell base stations 20 where the cells overlap each other.

The communication (communication in which the MCS index value is changed) to which the adaptive modulation control when switching the ABS pattern is applied in the aforementioned embodiment, may be a downlink communication to the mobile station apparatus from the base station apparatus, or an uplink communication to the base station apparatus from the mobile station apparatus. The base station apparatus, to which the adaptive modulation control when switching the ABS pattern is applied in the aforementioned embodiment, may be a base station apparatus of the small-cell base station, or a base station apparatus of the macro-cell base station.

In the present embodiments, although it is described on the premise that it is applied to LTE/LTE-Advanced, as long as the system uses a channel configuration similar to LTE/LTE-Advanced, the concept of the present invention can be applied to any system, and it is not limited to the configurations of the transmitter and the receiver described in the present embodiments. Moreover, the communication parameter for changing the value before switching the ABS pattern is not limited to the MCS index, and Any kind of the parameter suitable for use in the present embodiment for completing the HARQ retransmission before switching the ABS pattern may be used and is not limited to those defined by LTE/LTE-Advanced.

The process steps and configuration elements in the mobile communication system, base station apparatus and mobile station apparatus (user terminal equipment, mobile equipment) described in the present specification can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, terminal, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 macro-cell base station
10A macro cell
20 small-cell base station
20A small cell
30 mobile station apparatus (user terminal equipment, mobile equipment)
40 server apparatus
50, 51 communication line
100 radio communication frame
110 subframe
110' subframe stopping signal transmission (ABS)

The invention claimed is:

1. A base station apparatus capable of performing an inter-cell interference control by setting an ABS (Almost Blank Subframe) pattern with one cycle of a predetermined number of subframes, the base station apparatus comprising: means of:
    changing an MCS (Modulation and Coding Scheme) index value to a lower value, the MCS index value being determined by an adaptive modulation control, when the ABS pattern is to be switched, with respect to a subframe in which a communication with a mobile station apparatus is allowed before switching the ABS pattern and an allocation of radio communication is not performed in a retransmission control after switching the ABS pattern; and
    using the changed MCS index value for the specific subframe in an initial transmission or a retransmission of a data transmission that is performed before switching the ABS pattern,
    wherein, based on a number of remaining transmittable times of at least the retransmission of the data transmission for the specific subframe before switching the ABS pattern, the MCS index value determined by the adaptive modulation control is changed to a lower value as the number of remaining transmittable times is smaller, and
    wherein the changed MCS index value is used for the specific subframe before switching the ABS pattern.

2. The base station apparatus according to claim 1, wherein the MCS index value is based on the number of remaining transmittable times of the initial transmission and the retransmission of the data transmission for the specific subframe before switching the ABS pattern.

3. The base station apparatus according to claim 1, wherein a retransmission control by an HARQ (Hybrid Automatic Repeat reQuest) is applied, and
wherein, when a block error occurs in the initial transmission of the data transmission and a HARQ retransmission of the data transmission is performed before switching the ABS pattern, the MCS index value determined by the adaptive modulation control is changed to a lower value when performing an HARQ retransmission, with respect to a specific subframe in which the communication with the mobile station apparatus is allowed before switching the ABS pattern and an allocation of radio communication is not performed in an HAQR retransmission control after switching the ABS pattern, and the changed MCS index value is used for the specific subframe before switching the ABS pattern.

4. The base station apparatus according to claim 1, wherein the MCS index value is based on the number of remaining transmittable times of the retransmission of the data transmission for the specific subframe before switching the ABS pattern, and wherein the number of remaining transmittable times does not include the initial transmission.

5. The base station apparatus according to claim 1, wherein, when a MIMO (Multiple Input Multiple Output) for transmitting two or more streams is applied, with respect to the specific subframe, an MCS index value determined by the adaptive modulation control is changed to a different value for each rank that is the number of transmission streams, and
wherein the changed MCS index value is used for the specific subframe before switching the ABS pattern.

6. The base station apparatus according to claim 1, wherein the MCS index value to be determined by the adaptive modulation control is changed to an MCS index value by which the least error occurs.

7. The base station apparatus according to claim 1, wherein the communication in which the MCS index value is changed is an uplink communication, a downlink communication, or both of them.

8. For a base station apparatus capable of performing an inter-cell interference control by setting an ABS (Almost Blank Subframe) pattern with one cycle of a predetermined number of subframes, a method comprising:
    changing an MCS (Modulation and Coding Scheme) index value to a lower value, the MCS index value being determined by an adaptive modulation control, when the ABS pattern is to be switched, with respect to a subframe in which a communication with a mobile station apparatus is allowed before switching the ABS pattern and an allocation of radio communication is not performed in a retransmission control after switching the ABS pattern; and
    using the changed MCS index value for the specific subframe in an initial transmission or a retransmission of a data transmission that is performed before switching the ABS pattern,
    wherein, based on the number of remaining transmittable times of the initial transmission and the retransmission of the data transmission for the specific subframe before switching the ABS pattern, the MCS index value determined by the adaptive modulation control is changed to a lower value as the number of remaining transmittable times is smaller, and
    wherein the changed MCS index value is used for the specific subframe before switching the ABS pattern.

9. The method according to claim 8, wherein the MCS index value is based on the number of remaining transmittable times of the initial transmission and the retransmission of the data transmission for the specific subframe before switching the ABS pattern.

10. The method according to claim 8, wherein a retransmission control by an HARQ (Hybrid Automatic Repeat reQuest) is applied, and wherein, when a block error occurs in the initial transmission of the data transmission and a HARQ retransmission of the data transmission is performed before switching the ABS pattern, the MCS index value to be determined by the adaptive modulation control is changed to a lower value when performing an HARQ retransmission, with respect to a specific subframe in which the communication with the mobile station apparatus is allowed before switching the ABS pattern and an allocation of radio communication is not performed in an HAQR retransmission control after switching the ABS pattern, and the changed MCS index value is used for the specific subframe before switching the ABS pattern.

11. The method according to claim 8, wherein the MCS index value is based on the number of remaining transmittable times of the retransmission of the data transmission for the specific subframe before switching the ABS pattern, and wherein the number of remaining transmittable times does not include the initial transmission.

12. The method according to claim 8, wherein, when a MIMO (Multiple Input Multiple Output) for transmitting two or more streams is applied, with respect to the specific subframe, an MCS index value determined by the adaptive modulation control is changed to a different value for each rank that is the number of transmission streams, and wherein the changed MCS index value is used for the specific subframe before switching the ABS pattern.

13. The method according to claim 8, wherein the MCS index value to be determined by the adaptive modulation control is changed to an MCS index value by which the least error occurs.

14. The method according to claim 8, wherein the communication in which the MCS index value is changed is an uplink communication, a downlink communication, or both of them.

\* \* \* \* \*